(12) United States Patent
Niu et al.

(10) Patent No.: US 11,533,705 B2
(45) Date of Patent: Dec. 20, 2022

(54) ACCESS SIGNAL TRANSMISSION AND RECEPTION

(71) Applicant: ZTE CORPORATION, Guangdong (CN)

(72) Inventors: Li Niu, Shenzhen (CN); Yajun Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/149,992

(22) Filed: Jan. 15, 2021

(65) Prior Publication Data

US 2021/0136726 A1 May 6, 2021

Related U.S. Application Data

(63) Continuation of application No. PCT/CN2018/096101, filed on Jul. 18, 2018.

(51) Int. Cl.
| | |
|---|---|
| *H04L 12/43* | (2006.01) |
| *H04W 68/00* | (2009.01) |
| *H04W 48/08* | (2009.01) |

(52) U.S. Cl.
CPC ......... *H04W 68/005* (2013.01); *H04W 48/08* (2013.01)

(58) Field of Classification Search
CPC .... H04W 28/08; H04W 68/005; H04W 48/08
See application file for complete search history.

(56) References Cited

U.S. PATENT DOCUMENTS

| | | |
|---|---|---|
| 2018/0035380 A1 | 2/2018 | Chen et al. |
| 2019/0357119 A1* | 11/2019 | Hong ................... H04W 48/08 |

FOREIGN PATENT DOCUMENTS

| | | | |
|---|---|---|---|
| CN | 105191418 A | 12/2015 | |
| CN | 108282862 A | 7/2018 | |
| WO | WO-2018010509 A1 * | 1/2018 | ............ H04W 48/08 |

OTHER PUBLICATIONS

International Search Report and Written Opinion for PCT Appl. No. PCT/CN2018/096101 dated Apr. 19, 2019 (8 pages).

* cited by examiner

*Primary Examiner* — Gary Lafontant
(74) *Attorney, Agent, or Firm* — Foley & Lardner LLP

(57) ABSTRACT

Techniques are described to improve the transmission and reception of access signals such as synchronization signal block (SSB), system information, or paging message. As an example, a wireless communication method is disclosed where a network node, such as a base station, determines a first set of transmission times and/or a second set of transmission times to transmit access signals. The network node transmits the access signals over a wireless channel using the first set of transmission times and/or the second set of transmission times. The access signals can include system information, paging message, or synchronization signal block.

19 Claims, 5 Drawing Sheets

ACCESS SIGNAL TRANSMISSION AND RECEPTION

CROSS-REFERENCE TO RELATED APPLICATION

This application claims the benefit of priority under 35 U.S.C. § 120 as a continuation of PCT Patent Application No. PCT/CN2018/096101, filed on Jul. 18, 2018, the disclosure of which is incorporated herein by reference in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed to improve the transmission and reception of access signals such as synchronization signal block, system information, and/or paging message.

In one exemplary aspect, a wireless communication method includes determining, by a base station, any one or more of a first set of transmission times and a second set of transmission times to transmit access signals, and transmitting the access signals over a wireless channel using any one or more of the first set of transmission times and the second set of transmission times. The access signals include system information, paging message, or synchronization signal block.

In some embodiments, the base station determines to transmit the access signals using the second set of transmission times in response to for the base station determining that the wireless channel was busy at least one transmission time of the first set of transmission times.

In some embodiments, the base station configures a transmission start time for each of the first and second set of transmission times. In some embodiments, the second set of transmission times are based on the first set of transmission times. For example, the base station configures an offset or a delay between a first transmission time of the first set of transmission times and a second transmission time from the second set of transmission times. In some embodiments, the offset includes a time needed by the base station to transmit all synchronization signal block (SSB) index or all Channel State Information Reference Signal (CSI-RS) resource identifiers.

In some embodiments, a first transmission window is associated with the first set of transmission times and a second transmission window is associated with the second set of transmission times, where the base station configures a number of access signals to be transmitted within the first and second transmission windows.

In another exemplary aspect, a wireless communication method determines, by a user equipment, a time to receive an access signal during any one or more of a first set of monitoring times and a second set of monitoring times, and receives the access signal over a wireless channel during any one or more of the first set of monitoring times and the second set of monitoring times.

In some embodiments, the time to receive the access signal during the second set of monitoring times is determined based on a relationship between a characteristic of the access signal to be received during the first set of monitoring times and another characteristic of the access signal to be received during the second set of monitoring times. In some other embodiments, the time to receive the access signal during the first set of monitoring times is determined based on based on a relationship between a characteristic of the access signal to be received during the first set of monitoring times and another characteristic of the access signal to be received during the second set of monitoring times.

In some embodiments, the relationship is an offset between a first identifier of the access signal associated with the first set of monitoring times and a second identifier of the access signal associated with the second set of monitoring times. In some other embodiments, the relationship is an offset between a first transmission time of the access signal associated with the first set of monitoring times and a second transmission time of the access signal associated with the second set of monitoring times, and where the first and second transmission times are configured by the base station. In yet some other embodiments, the relationship is an offset between a first monitoring time of the access signal associated with the first set of monitoring times and a second monitoring time of the access signal associated with the second set of monitoring times, and where the first and second monitoring times are determined by the user equipment.

In some embodiments where the access message includes a paging message, the second set of monitoring times for the paging message are configured to be a next consecutive set of paging times after the first set of monitoring times for the paging message. In some other embodiments where the access message includes a paging message, the second set of monitoring times are configured to receive the paging message at a next paging time after a first set of monitoring times for the paging message, where the next paging time is determined based on an identifier of the user equipment.

In another exemplary aspect, a wireless communication method transmits, by a base station to a plurality of user equipment, a downlink control indicator (DCI) scrambled by a Radio Network Temporary Identifier (RNTI) to indicate a bandwidth path (BWP) switching for the plurality of user equipment. In some embodiments, the RNTI includes a paging RNTI (P-RNTI), a slot format indicator RNTI (SFI-RNTI), or a common RNTI.

In yet another exemplary aspect, the above-described method is embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
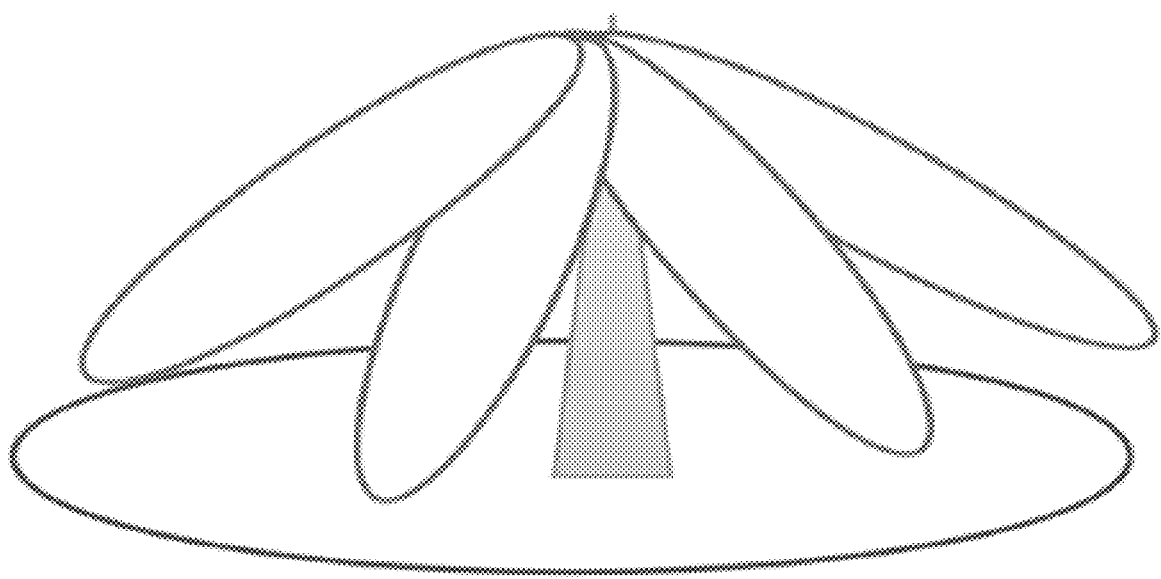
FIG. 1 illustrates beamforming technology employed by a 5G wireless communication system.

The demand for wireless spectrum is increasing with the rapid growth of user data. As a result, a 5G communication system can support a higher frequency spectrum, such as 3.5 GHz. FIG. 1 illustrates beamforming technology employed by a 5G wireless communication system to adapt to the characteristics of high frequency attenuation. By using techniques such as beamforming, a 5G communication system can support a data rate of up to 20 Gbps.

Because the licensed spectrum has been allocated and is almost saturated, it is very difficult to allocate more spectrum. Furthermore, a high cost of the licensed spectrum corresponds to a high cost for the wireless operator. Thus, the use of unlicensed spectrum for providing services to users is becoming an option for operators. Some differences between a licensed and an unlicensed spectrum is that the unlicensed spectrum has high flexibility of use, more selection of spectral bands and bandwidths and greater bandwidth in each spectral band, for example below 7 GHz, from 7 to 52.6 GHz, and above 52.6 GHz. Therefore, the 5G communication system can support the high-frequency unlicensed spectrum, and the unlicensed spectrum can inherit the access technology of the licensed spectrum, such as beamforming technology.

In a communication system, the cell or base station can generate and transmit some access signals to enable a user equipment (UE) to access the cell. For some access signals, for example, synchronization signal block (SSB), system information, or paging message, the UE in the idle state or inactive state may obtain the timing relationship of the cell or base station by receiving the SSB signal. Furthermore, the UE may obtain the cell information by obtaining the system information broadcasted by the cell or base station. Access information and resource configuration may be obtained by the UE. The UE may periodically monitor the paging message at a fixed paging moment to receive the paging message in time and to access the cell to establish a service. The access signals (e.g., SSB, system information, or paging message) provide important information related to the network and access parameters to the UE. And, considering the downlink coverage enhancement, the access signals may be transmitted using beamforming techniques. Although each beam is directional, considering that UEs may be spread throughout the cell, the access signals should be received by each UE in the cell. For example, the access signals may be transmitted in all directions (e.g., beam-sweeping) so that the UE can select to receive signals in one of the beam directions according to its own reception.

However, since the unlicensed spectrum is a shared spectrum, a UE may obtain the right to use the spectrum in a competitive, or opportunistic, manner. That is, the UE may sense availability of the spectrum before sending the data. If the medium sensing succeeds, the data can be sent. Otherwise, the UE waits for the next opportunity until the UE succeeds. For example, the UE may use a back-off process to search for a next available opportunity. Also, the mechanism for accessing the spectrum should be fair. In view of this, the 3GPP and ETSI standards have introduced the "Listen Before Talk" (LBT) technique. Before sending data, the sender UE listens or perceives whether the channel is idle or busy. If the channel is idle, the sender UE can use the channel to send data. Otherwise, the sender UE cannot send data.

If the base station uses an unlicensed spectrum, the base station acquires the channel before transmitting the signal. Similarly, when the base station needs to send some access signals (e.g., SSB, system information, or paging message) at certain time, it may perform LBT before that time. If the LBT succeeds, the access signals can be successfully transmitted. However, if the LBT fails, then the access signals fail to be sent at this moment, and the base station waits for the next transmission time and then try to send these signals. However, waiting for the next transmission time will cause delays in the transmission of the access signals, thereby affecting the time it takes for a UE to acquire signals and access the cell.

To reduce these effects, among others, wireless techniques can be introduced to increase the chances of sending the access signals. If, at some point, the LBT fails and the access signal is not successfully transmitted, then the cell can attempt to transmit the access signals again at a subsequent time. The UE may attempt to receive the access signals at multiple times. Thus, this patent document discloses techniques that can be used in some embodiments to increase the transmission of access signals such as synchronization signal block, system information, and/or paging message. Some embodiments based on the disclosed technique can reduce the delay of the UE accessing the cell, and it can save the power consumption of the UE.

Section headings are used in the present document to improve readability and do not limit the embodiments and techniques described in a section to that section only. According, one or more features from one section may be used or implemented in another section.

Example Embodiment 1

The first embodiment discloses a newly added synchronization signal block, system information, or paging message transmission opportunity that can be associated with the newly added SSB index or Channel State Information Reference Signal (CSI-RS) resource identifier (ID).

Figure 2:
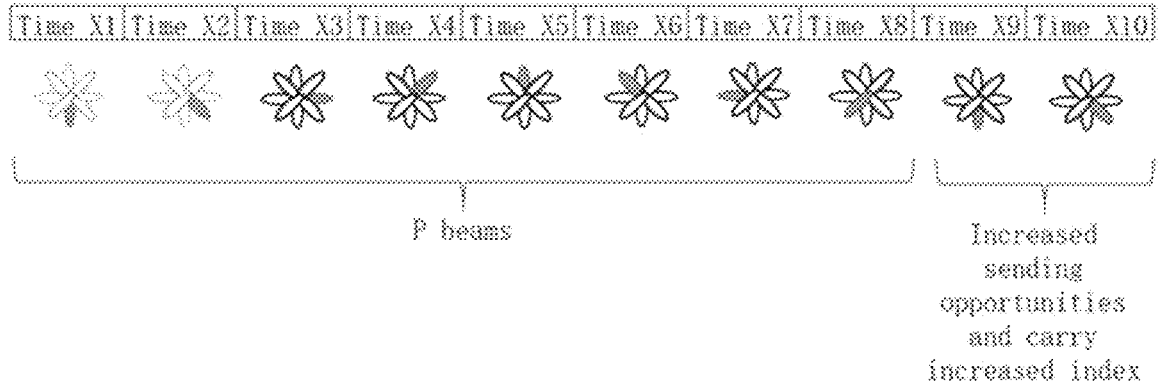
FIG. 2 shows an example timing diagram and associated beams to increase transmission opportunities for sending synchronization signal block, system information, or paging message.

To manage the UEs located within the transmission range of the cell, the base station can sequentially send synchronization signal block, system information, or paging message in the direction of each beam for a certain or a pre-determined period of time. Before the base station sends each of the synchronization signal block, system information, or paging message, the base station may perform an LBT. If the LBT fails, the synchronization signal block, system information, or paging message cannot be sent out on a certain beam. In order not to affect the access of the UE, as shown in FIG. 2, the base station can increase the transmission opportunity of transmitting the synchronization signal block, system information, or paging message on the beam by adding a beam to transmit the synchronization signal block, system information, or paging message.

The base station can determine the various transmission start times (e.g., X1 to X10 in FIG. 2) to transmit an access signal using beams corresponding to the transmission start times. For example, as shown in FIG. 2, the base station can transmit the newly added beams at times X9 and X10, where the beams X9 and X10 correspond to beams at times X1 and X2. The transmission times X1 to X8 can be considered a first set of transmission times, and the newly added beam(s) at times X9 and X10 can be considered a second set of transmission times, where the second set of transmission times can be adjacent to the first set of transmission times. As further explained in this patent document, the second set of transmission times can be based on the first set of transmission times. To distinguish a newly added beam, the beam associated with times X9 and X10 can be associated with a newly added identifier.

If a UE selects to receive the synchronization signal block, system information, or paging message on a certain beam, the UE can search for the monitoring time(s) corresponding to the beam according to the old or new identifier associated with the beam, including the original monitoring time and/or the newly added monitoring time. Thus, the UE may monitor the synchronization signal block, system information, or paging messages based on the monitoring time(s).

In some embodiments, the beam can be associated by SSB index or a CSI-RS resource ID. For example, a base station may need to send the synchronization signal block, system information, or paging message associated with the SSB index or CSI-RS resource ID i at time Xi. But since the base station may not obtain the channel access right, the base station does not transmit the synchronization signal block, system information, or paging message associated with the SSB index or the CSI-RS resource ID i. In such an example scenario, the base station continues to sense availability of the wireless channel. If the medium sensing of a wireless channel is successful, the base station may reissue at time Xj the synchronization signal block, system information, or paging message associated with the newly added SSB index or CSI-RS resource ID j, where time Xj is later in time compared to time Xi. The direction of beam associated with the SSB index or the CSI-RS resource ID j can be the same as the direction of beam associated with the SSB index or the CSI-RS resource ID i. Thus, the newly added SSB index or CSI-RS resource ID for transmission of the synchronization signal block, system information, or paging message at time Xj can be different from the SSB index or CSI-RS resource ID configured to be transmitted at time Xi. The identifiers i and j can have a corresponding mathematical relationship. In some embodiments, a base station can configure the correspondence or relationship between i and j. In some embodiments, i and j may have a linear relationship. For example, j=(i+offset), where offset can be a number of all SSB index or all CSI-RS resource IDs that the base station needs to send, as shown in FIG. 2. The various offsets described in this patent document can be configured by the base station.

In some embodiments, if the UE selects to monitor the synchronization signal block, system information, or paging message associated with the SSB index or CSI-RS resource ID i, then the UE can start monitoring the PDCCH search space at the corresponding time. The UE can determine the monitoring time through the SSB index or CSI-RS resource ID i, including the newly added monitoring time. For example, for the SSB index or CSI-RS resource ID i, it is assumed that the monitoring time corresponding to the SSB index or CSI-RS resource ID i is given by Equation (1) shown below:

$$Xi = (O \cdot 2^\mu + \lfloor i \cdot M \rfloor) \bmod N_{slot}^{frame,\mu} \quad \text{Equation (1)}$$

where O is the transmission starting time and is configured by the base station; M is related to the number of search spaces and is configured by the base station; $N_{slot}^{frame,\mu}$ is the number of slots included in a frame; and $\mu$ is the index of the numerology used for synchronization signal block, system information, or paging message.

In some embodiments, for the SSB index or CSI-RS resource ID j, the UE can determine the SSB index or CSI-RS resource ID j by using the SSB index or CSI-RS resource ID i. The SSB index or CSI-RS resource ID i relates to a reception of the synchronization signal block, system information, or paging message at another time Xi prior to the time Xj that relates to the reception of SSB index or CSI-RS resource ID j. The UE can determine the monitoring time to receive SSB index or CSI-RS resource ID j based on the received SSB index or CSI-RS resource ID i. For example, if j=i+offset, then the new monitoring time Xj is given by Equation (2) shown below:

$$Xj = (O \cdot 2^\mu + \lfloor j \cdot M \rfloor) \bmod N_{slot}^{frame,\mu} \quad \text{Equation (2)}$$

The value for the offset can be the number of all SSB index or all CSI-RS resource IDs that the base station needs to send.

In some embodiments, for SSB index or CSI-RS resource ID j, the UE determines the newly added monitoring time by using the monitoring time of the SSB index or CSI-RS resource ID i. For example, Xj can be equal to Xi+offset1, where offset1 is a time required for all SSB index or all CSI-RS resource IDs that the base station needs to send.

In some embodiments, for SSB index or CSI-RS resource ID j, the UE can determine the newly added monitoring time by the starting time of the SSB index or CSI-RS resource ID i. For example, O=(starting time of the SSB index or CSI-RS resource ID i+offset), where the new monitoring time Xj is given by Equation (2) shown above.

In some embodiments, if the UE selects to monitor the synchronization signal block, system information, or paging message associated with the SSB index or CSI-RS resource ID i, then the UE can start monitoring the PDCCH search space at the corresponding time. The UE can determine the monitoring time by using the SSB index or CSI-RS resource ID j, including the original monitoring time corresponding to the SSB index or CSI-RS resource ID i. For example, for SSB index or CSI-RS resource ID j, assume that the newly added monitoring time corresponding to SSB index or CSI-RS resource ID j is Xj given by Equation (2) shown above.

In some embodiments, for the SSB index or CSI-RS resource ID i, the UE can determine the SSB index or CSI-RS resource ID i by using the SSB index or CSI-RS resource ID j. The SSB index or CSI-RS resource ID j relates to a reception of the synchronization signal block, system information, or paging message at another time Xj prior to the time Xi that relates to the reception of SSB index or CSI-RS resource ID i. The UE can determine the monitoring time to receive SSB index or CSI-RS resource ID i based on the received SSB index or CSI-RS resource ID j. For example, if i=j-offset, then original monitoring time Xi is given by Equation (1) shown above, where the value for the offset can be the number of all SSB index or CSI-RS resource IDs that the base station needs to send.

In some embodiments, for the SSB index or CSI-RS resource ID i, the UE can determine the original monitoring time by using the monitoring time of the SSB index or CSI-RS resource ID j. For example, Xi can equal to Xj-offset1, where offset1 is the time required for all SSB index or all CSI-RS resource IDs that the base station needs to send.

In some embodiments, for SB index or CSI-RS resource ID i, the UE can determine the newly added monitoring time by the starting time of the SSB index or CSI-RS resource ID j. For example, O=(starting time of the SSB or CSI-RS resource ID j-offset), where the original monitoring time Xi is given by Equation (1) shown above.

The UE can monitor the PDCCH at both Xi and Xj times until the monitoring is successful. Here, there may be multiple opportunities for the newly added transmission where each transmission opportunity can be associated with the newly added SSB index or CSI-RS resource ID. For example, Xj can represent multiple times, and SSB index or CSI-RS resource ID j can represent multiple resources.

Example Embodiment 2

Figure 3:
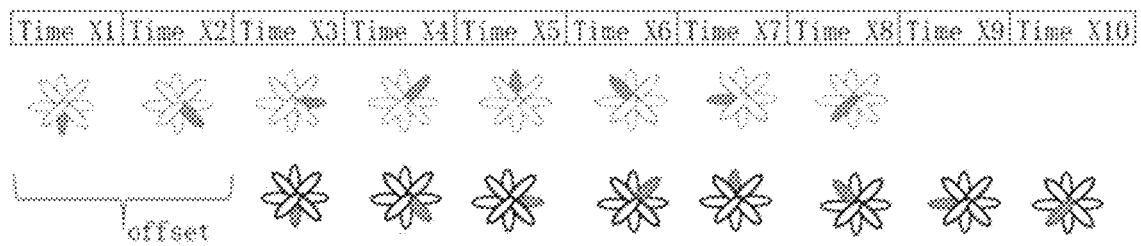
FIG. 3 shows an example timing diagram and associated beams that delays synchronization signal block, system information, or paging message transmission opportunity.

FIG. 3 shows an example timing diagram and associated beams of a second embodiment that delays synchronization signal block, system information, or paging message transmission opportunity.

To manage the UEs located within the transmission range of the cell, the base station can sequentially send synchronization signal block, system information, or paging message in the direction of each beam for a period of time. Before the base station sends the synchronization signal block, system information, or paging message, the base station may perform an LBT. If the LBT fails, the synchronization signal block, system information, or paging message cannot be sent out on a certain beam. In order not to affect the access of the UE, the base station can continue to perform the LBT. After the LBT succeeds, the base station can delay the transmission of the synchronization signal block, system information, or paging message on the beam. As shown in FIG. 3, the base station can add a delay so that the transmission corresponding to the first beam starts at time X3. The transmission times X1 to X8 can be considered a first set of transmission times, and the transmission times X3 to X10 can be considered a second set of transmission times, where the second set of transmission times can be an offset of the first set of transmission times. The base station can configure the transmission times for times X1 to time X10.

If a UE selects to receive the synchronization signal block, system information, or paging message on a certain beam, the UE can search for the monitoring time corresponding to the beam according to the identifier associated with the beam, including the original monitoring time and the delayed monitoring time. The synchronization signal block, system information, or paging message can be monitored from the monitoring time.

In some embodiments, beam can be associated by SSB index or CSI-RS resource ID. For example, the base station may need to send the synchronization signal block, system information, or paging message associated with the SSB index or CSI-RS resource ID i at time Xi. But since the base station may not obtain the channel access right, the base station does not transmit the synchronization signal block, system information, or paging message associated with the SSB index or the CSI-RS resource ID i. In such an example scenario, the base station continues to sense availability of the channel. If the medium sensing is successful, the base station may reissue the synchronization signal block, system information, or paging message associated with the SSB index or CSI-RS resource ID i at time Xj.

In some embodiments, if the UE selects to monitor the synchronization signal block, system information, or paging message associated with the SSB index or CSI-RS resource ID i, then the UE can start monitoring the PDCCH search space at the corresponding time. The UE can determine the monitoring time through the SSB index or CSI-RS resource ID i, that may include the delayed monitoring time.

For example, for the SSB index or CSI-RS resource ID i, it is assumed that the monitoring time corresponding to the SSB index or CSI-RS resource ID i is given by Xi as shown above in Equation (1).

For the delay time associated with the SSB index or CSI-RS resource ID i, the monitoring time of the delay can be determined by the monitoring time of the SSB index or CSI-RS resource ID i to be Xj, for example, Xj=Xi+offset1. Offset1 can be the time when the base station delays transmission.

Alternatively, for the delay time associated with the SSB index or CSI-RS resource ID i, the monitoring time of the delay can be determined to be Xj by adjusting the starting time. For example, Xj can be given by Equation (3) shown below:

$$xj = (O_1 \cdot 2^\mu + \lfloor i \cdot M \rfloor) \bmod N_{slot}^{frame,\mu} \quad \text{Equation (3)}$$

where O1=O+offset2; offset2 can be the time when the base station delays transmission; and O is a pre-delay transmission time of the synchronization signal block, system information, or paging message.

The UE can monitor the PDCCH at both Xi and Xj times until the monitoring is successful.

Example Embodiment 3

Figure 4:
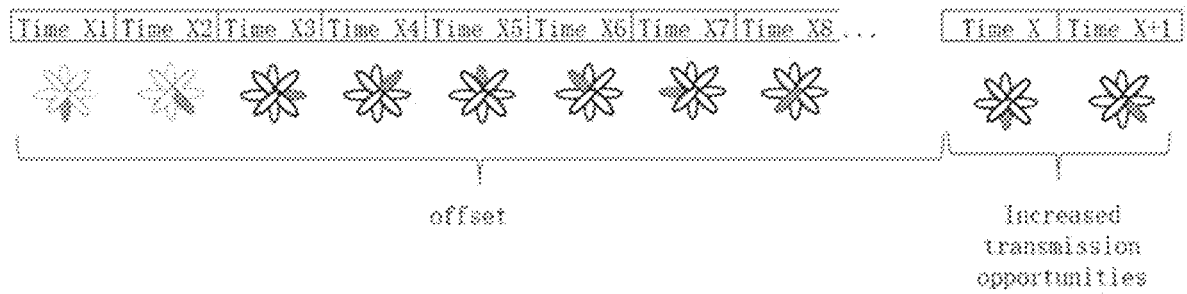
FIG. 4 shows another example timing diagram and associated beams to increase transmission opportunities for sending synchronization signal block, system information, or paging message.

FIG. 4 shows an example timing diagram and associated beams of a third embodiment that can increase the chances of sending some or all of the beam in other locations.

To manage the UEs located within the transmission range of the cell, the base station can sequentially send synchronization signal block, system information, or paging message in the direction of each beam for a period of time. Before the base station sends the synchronization signal block, system information, or paging message, the base station may perform an LBT. If the LBT fails, the synchronization signal block, system information, or paging message cannot be sent out on a certain beam. In order not to affect the access of the UE, the base station can continue to perform the LBT. After the LBT succeeds, the base station can add the transmission opportunity of transmitting the synchronization signal block, system information, or paging message on the beam at additional times. For example, as shown in FIG. 4, the newly added beam(s) at times X and X+1 can follow after a time interval the first set of beams that correspond to times X1 to X8. In some embodiments, the time X can be a pre-defined value or the time interval between times X8 and X can be a pre-defined value. The transmission times X1 to X8 can be considered a first set of transmission times, and the transmission times X and X+1 can be considered a second set of transmission times, where the second set of transmission times can follow the first set of transmission times after a certain delay or after a time-interval.

If a UE selects to receive the synchronization signal block, system information, or paging message on a certain beam, the UE can search for the monitoring time corresponding to the beam according to the identifier associated with the beam, including the original monitoring time and the increased monitoring time. The synchronization signal block, system information, or paging message can be monitored from the monitoring time.

In some embodiments, beam can be associated by SSB index or CSI-RS resource ID. For example, the base station needs to send the system information/paging message associated with the SSB index or CSI-RS resource ID i at time Xi. But since the base station may not obtain the channel access right, the base station does not transmit the synchronization signal block, system information, or paging message associated with the SSB index or CSI-RS resource ID i. In such an example scenario, the base station continues to sense availability of the channel. If the medium sensing is successful, the base station may reissue the synchronization signal block, system information, or paging message associated with the SSB index or CSI-RS resource ID i at time Xj.

In some embodiments, if the UE selects to monitor the synchronization signal block, system information, or paging message associated with the SSB index or CSI-RS resource ID i, then the UE can start monitoring the PDCCH search space at the corresponding moment. The UE can determine the monitoring time through the SSB index or CSI-RS resource ID i including the increased monitoring time.

For example, for the SSB index or CSI-RS resource ID i, it is assumed that the monitoring time corresponding to the SSB index or CSI-RS resource ID i is given by Xi as shown above in Equation (1).

For the increased monitoring time associated with the SSB index or CSI-RS resource ID i, the monitoring time of the offset can be determined by the monitoring time of the SSB index or CSI-RS resource ID i to be Xj, for example, Xj=Xi+offset1. Offset1 can be the time when the base station offsets transmission, and can be configured by the base station.

Alternatively, for the increased monitoring time associated with the SSB index or CSI-RS resource ID i, the monitoring time of the offset can be determined to be Xj by adjusting the starting time. For example, Xj can be given by Equation (3) shown above, where O1=O+offset2; offset2 can be the time when the base station offsets transmission, and can be configured by the base station; and O is a pre-offset transmission time of the synchronization signal block, system information, or paging message.

The UE can monitor the PDCCH at both Xi and Xj times until the monitoring is successful. In example embodiment 3, there may be more than one newly added transmission opportunity.

Example Embodiment 4

The fourth embodiment discloses techniques to perform paging occasion (PO) calculation.

For paging, the UE can find the paging frame (PF) and the paging time according to its own user identity, and then can obtain the paging message. But since the base station LBT fails, the base station does not send the paging message, and the UE may not listen to the paging message at the paging time. If the base station increases the paging time and increases the sending time of the paging message, the UE can continue to monitor the paging message at the newly added paging time.

In some embodiments, it is assumed that for the base station, N paging times are configured in one frame.

In some embodiments, for the UE, there may be additional M candidate paging times, where M may be broadcast or configured by the base station. The UE can obtain the first paging frame (PF) (the radio frame where the paging time is located), and paging time index value $i\_s$ according to its own user identifier such as S-TMSI. The paging time can be obtained from the paging time index value $i\_s$. The additional candidate paging time can be the next consecutive M paging times. Thus, a UE may receive one or more paging messages at a first set of monitoring times and a second set of monitoring times, where the second set of monitoring times include the next consecutive M paging times that can follow immediately after the first set of monitoring times. For example, the UE can derive an additional candidate paging time as: $i\_s\_additional=(i\_s+m) \mod N$, $PF\_additional=PF+floor((i\_s+m)/N)$, $m=0 \ldots M$. The UE may listen to the paging message at the paging moments of the M candidates derived through $i\_s\_additional$ and $PF\_additional$ until the paging message is successfully received.

In some embodiments, for a PO corresponding to a paging frame PF and $i\_s$, the paging message of all UEs corresponding to the PO may not be successfully transmitted by the base station because of an LBT failure. These UEs can be evenly distributed to the next M paging time, reducing the load of paging time. The UE obtains the first paging frame PF (the radio frame where the paging time is located) and $i\_s$ ($i\_s$ is the index value of the paging time, and the paging time can be obtained by $i\_s$) according to the identifier of the user equipment, In the next M paging moments, look for your own paging moment. For example: $i\_s\_additional=(i\_s+(UE\_ID) \mod M)) \mod N$, $PF\_additional=PF+floor((i\_s+(UE\_ID) \mod M)/N)$. The UE may listen to the paging message at the next candidate paging moment derived through $i\_s\_additional$ and $PF\_additional$. The method is not limited to searching for a candidate paging moment, and the method can be used to iteratively search for multiple candidate paging moments.

In some embodiments, for the UE, a new paging moment may be added, where the newly added paging time may be broadcast or configured by the base station. For example, the base station may configure the time difference, the added paging time, and/or the offset of the original paging time. The UE obtains the original paging frame PF (the radio frame where the paging time is located) and $i\_s$ according to its own user identifier ($i\_s$ is the index value of the paging time, and the paging time can be obtained by $i\_s$), and the new paging moment is added. It is a certain time after the original paging moment. For example, the UE may derive an extra candidate paging moment as: $i\_s\_additional=(i\_s+offset) \mod N$, $PF\_additional=PF+floor((i\_s+offset)/N)$. The UE may listen to the paging message at the new paging moment derived through $i\_s\_additional$ and $PF\_additional$.

Example Embodiment 5

The fifth embodiment discloses a multi-window mechanism. When the base station has downlink data transmission, the base station performs LBT. If the LBT is successful, the base station successfully obtains the channel access right, and the duration of the downlink data transmission by the base station may not exceed the maximum channel occupation time (MCOT). That is, the time that the base station obtains the channel access right each time may not exceed the maximum channel occupation time.

Figure 5A:
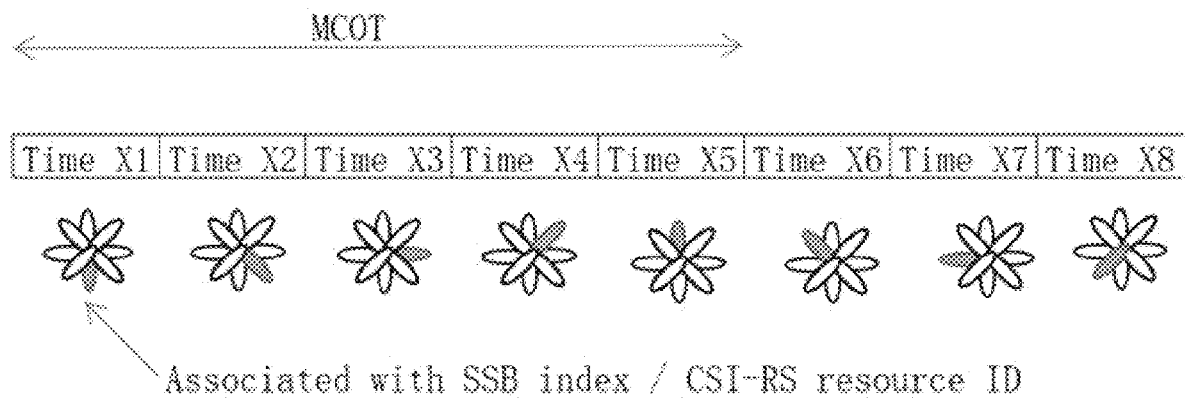
FIGS. 5A-5C show example timing diagrams and associated beams for transmissions of synchronization signal block, system information, or paging message during one or more transmission windows.

When the base station determines to send the synchronization signal block, system information, or paging message, the base station may need to send all the synchronization signal block, system information, or paging message on the beam to ensure that all UEs under the cell can receive the synchronization signal block, system information, or paging message. FIG. 5A shows that sending all synchronization signal block, system information, or paging message may require a certain duration.

When the base station wants to send a synchronization signal block, system information, or paging message, the base station first performs an LBT. If the LBT is successful, the base station can send the synchronization signal block, system information, or paging message within the maximum channel occupation time. However, when the maximum channel occupation time obtained by the base station is less than the time required to transmit the synchronization signal block, system information, or paging message, the base station may not complete transmitting the synchronization signal block, system information, or paging message on all the beams. Then, the base station may need to perform LBT again until the remaining synchronization signal block, system information, or paging message is sent out.

Figure 5B:
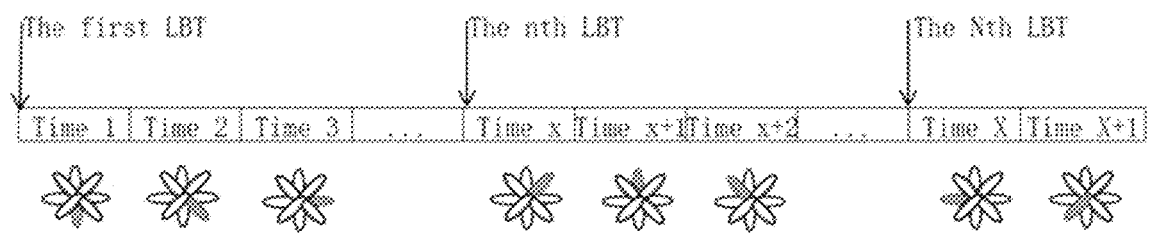

In some embodiments, as shown in FIG. 5B, the base station can transmit synchronization signal block, system information, or paging message on one or more directions associated with the one or more beams by obtaining N times the channel access rights, where N is greater than or equal to one. After the base station gets the channel access right or LBT success, the base station can transmit for one or more duration, where each duration is known as a transmission window. Within each transmission window, the base station can sequentially transmit corresponding synchronization signal block, system information, or paging message on each direction of part of all the beam. Through the N times transmission window, synchronization signal block, system information, or paging message on direction of all beam can be sent out. The base station can broadcast or configure the start times of N transmission window or the offset between each transmission start time. The base station may perform LBT before each start time. If the LBT is successful, the base station can send access signal(s) during a window. In this embodiment, the base station may obtain N times of channel access rights so that N transmission windows may be obtained.

The UE can sequentially start to detect the PDCCH corresponding to the synchronization signal block, system information, or paging message at the start time of the N transmission windows, where N can be greater than or equal to one.

Figure 5C:
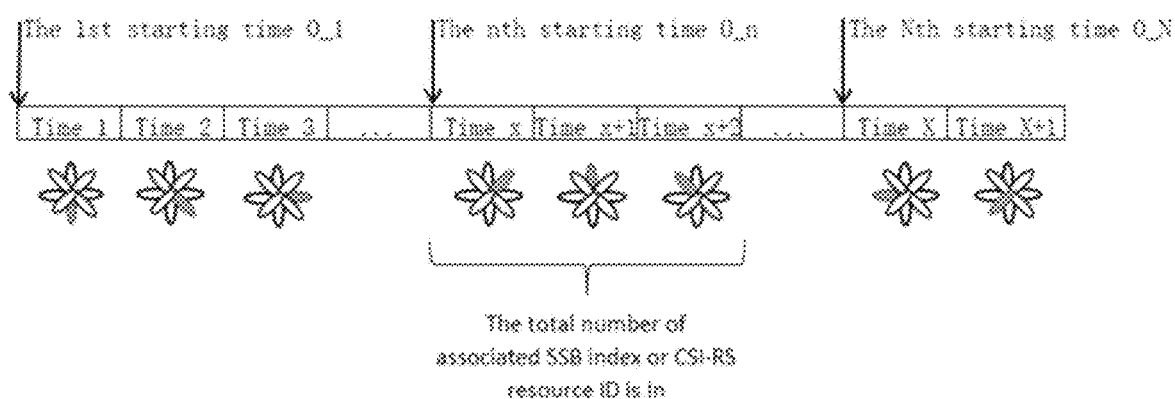

In some embodiments, as shown in FIG. 5C, the synchronization signal block, system information, or paging message transmitted by the base station for all beams may need to obtain N times the channel access rights. Thus, N successful LBTs may be needed, where N is greater than or equal to one. The base station can broadcast or configure start times of N transmission windows or offsets between each start time. The base station can also broadcast or configure which of the one or more beams can be used for each transmission window. The base station may perform LBT before each start time. If the LBT is successful, the base station can send access signal(s) during window. Within each transmission window, the base station may transmit a synchronization signal block, system information, or paging message on the corresponding beam. Assuming that the beam can be associated by SSB index or CSI-RS resource ID, the base station can transmit all the synchronization signal block, system information, or paging message associated with the SSB index or CSI-RS resource ID. In this embodiment, the base station may obtain N times of channel access rights so that N transmission windows may be obtained. The base station can broadcast or configures the information about N transmission windows and the information of which associated SSB index or CSI-RS resource IDs are transmitted at each transmission window by the base station. For example, a base station can broadcast or configure a bitmap, or list of SSB indexes, or CSI-RS resource IDs. Alternatively, for each transmission window, the base station may configure the number of associated SSB indexes or CSI-RS resource IDs.

In some embodiments, a UE may select to receive the synchronization signal block, system information, or paging message on a certain beam, so that the UE can determine which transmission window the beam belongs to, and then the UE can monitor the synchronization signal block, system information, or paging message on the beam in the corresponding transmission window. For example, when the UE wants to receive the synchronization signal block, system information, or paging message on a beam associated with the SSB index or CSI-RS resource ID i, then according to the information of the transmission window configured by the base station, if the information of SSB index or CSI-RS resource ID for each transmission window is configured, then the UE can find the corresponding transmission window through the SSB index or CSI-RS resource ID i. If the base station configures the number of SSB index or CSI-RS resource IDs for each transmission window, when the SSB index or CSI-RS resource ID i is less than or equal to all sent SSB index or CSI-RS resource IDs of the sum of the nth transmission window (including the nth time, n《N), and greater than all sent SSB index or CSI-RS resource IDs of the sum of the n−1th transmission window (including the n−1th, n《N), such as $$\sum_{m=1}^{n-1} I_m < i \sum_{《m=1}^{n} I_m,$$

then the UE can consider the SSB index/CSI-RS resource ID i to belong to the nth transmission window.

The UE can find which transmission window the SSB index or CSI-RS resource ID i belongs to, so as to start detecting the PDCCH corresponding to the system information or paging message at the corresponding start time.

In some embodiments, for the UE, selecting to receive the synchronization signal block, system information, or paging message on a certain beam, the UE determines which transmission window the beam belongs to, and then monitors the beam in the corresponding transmission window at the monitoring time corresponding to the beam. For example, the UE can determine, according to the SSB index or CSI-RS resource ID i and the configuration information of the base station, that the SSB index or CSI-RS resource ID i belongs to the nth transmission window. For the nth transmission window, as shown in FIG. 5C, the start time is O_n, the total number of transmitted associated SSB index or CSI-RS resource ID number is "In" (in FIG. 5C), and the beam associated with the SSB index or CSI-RS resource ID i "in" in Equation (4), then the UE can determine $n_0$ to detect the PDCCH at the time based on Equation (4), as shown below:

$$n_0 = (O \cdot 2^\mu + \lfloor i_n \cdot M \rfloor) \bmod N_{slot}^{frame,\mu} \quad \text{Equation (4)}$$

where, $O=O\_n$, in=i-I1- ... In-1.

Example Embodiment 6

A plurality of bandwidth parts (BWPs) are supported on a wide carrier, and for each BWP, multiple UEs can be anchored to the BWP to monitor the PDCCH common search space. When a BWP may be severely interfered, the UEs need to be switched to other BWPs. However, the base station sends UE-level DCI to each UE one by one, and converts to other BWPs, which requires a large amount of DCI signaling, resulting in excessive load.

In some embodiments, the base station uses a downlink control indicator (DCI) scrambled by the Paging Radio Network Temporary Identifier (P-RNTI) to indicate the BWP conversion. The base station sends the DCI scrambled by the P-RNTI that may carry the flag indicating the DCI is for BWP switching, and the BWP ID of the target BWP, indicating the identifier of the BWP conversion. The UE can monitor the DCI scrambled by the P-RNTI at its own paging moment according to its own UE identity, for example, S-TMSI. If the decoding is successful, and the DCI indicates that the DCI is a BWP switching command, then the UE can switch to the target BWP according to the target BWP ID and anchor to the target BWP.

In some embodiments, the base station uses the DCI scrambled by the slot format indicator RNTI (SFI-RNTI) to indicate the BWP conversion. The base station delivers the DCI scrambled by the SFI-RNTI that may carry the flag indicating the DCI is for BWP switching, and the BWP ID of the target BWP, indicating the identifier of the BWP conversion. The UE can monitor the DCI scrambled by the SFI-RNTI. If the decoding is successful and the DCI indicates that the DCI is a BWP conversion command, then the UE can switch to the target BWP according to the target BWP ID and anchor to the target BWP.

In some embodiments, when certain conditions are met, the base station can indicate the BWP conversion by DCI scrambled by a common RNTI (for example, P-RNTI, SI-RNTI, SFI-RNTI, newly defined RNTI, etc.,). The base station configures measurement events, for example, the Reference Signal Received Power (RSRP) or Reference Signal Received Quality (RSRQ) or the current BWP or cell to be less than a certain threshold, or Received Signal Strength Indicator (RSSI) or channel occupancy of the current BWP/cell to be higher than a certain threshold. Based on the measurement events, when the base station determines that the interference is heavy, the base station can scramble the DCI using the common RNTI to indicate BWP conversion. The UE performs measurement according to the measurement configuration. When the measurement event is satisfied, for example, the RSRP or RSRQ measured by the UE is less than a certain threshold, or RSSI or channel occupancy measured by the UE is higher than a certain threshold, then the UE starts to monitor the DCI scrambled by the common RNTI. If the decoding of the DCI is successful and the DCI indicates that the DCI is a BWP conversion command, the UE can switch to the target BWP according to the target BWP ID and anchor to the target BWP.

Figure 6:
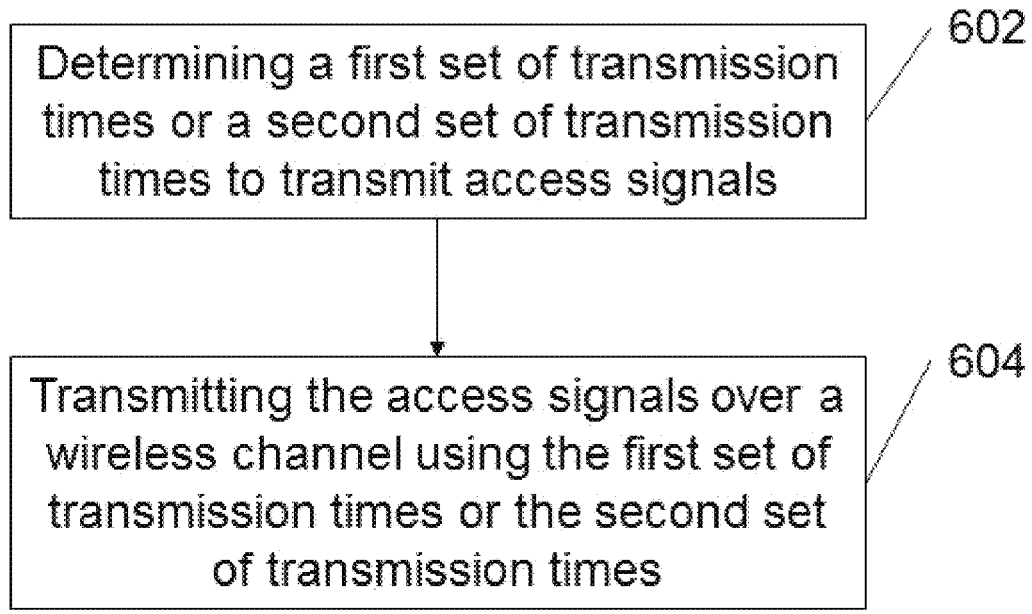
FIG. 6 shows an exemplary flowchart of a wireless communication method to transmit access signals.

FIG. 6 shows an exemplary flowchart of a wireless communication method to transmit access signals. At the determining operation 602, the base station determines any one or more of a first set of transmission times and a second set of transmission times to transmit access signals. The access signals include system information, paging message, or synchronization signal block. In some embodiments, the base station determines to transmit the access signals using the second set of transmission times in response to for the base station determining that the wireless channel was busy at least one transmission time of the first set of transmission times. The base station configures a transmission start time for each of the first and second set of transmission times. As further described in this patent document, the base station can transmit the access signals using the first set of transmission times, or using the second set of transmission times, or using both the first and second sets of transmission times. The base station may determine the first or second set of transmission times based on one or more lookup tables that may include the timing for the first or second set of transmissions times.

In some embodiments, the second set of transmission times are based on the first set of transmission times. For example, the base station configures an offset or a delay between a first transmission time of the first set of transmission times and a second transmission time from the second set of transmission times. Specifically, and as another example, the base station can determine a second set of transmission times by performing any one of (1) determining a transmission time of the second set of transmission times being equal to another transmission time of the first set of transmission times added to an offset, where the second set of transmission times are adjacent to the first set of transmission times; (2) determining a transmission time of the second set of transmission times being equal to a first transmission time of the first set of transmission times added to a delay; and (3) determining a transmission time of the second set of transmission times being equal to another transmission time of the first set of transmission times added to the offset, where the second set of transmission times follow the first set of transmission times after a time interval. In some embodiments, the offset includes a time needed by the base station to transmit all synchronization signal block (SSB) index or all Channel State Information Reference Signal (CSI-RS) resource identifiers.

In some embodiments, a first transmission window is associated with the first set of transmission times and a second transmission window is associated with the second set of transmission times, where the base station configures a number of access signals to be transmitted within the first and second transmission windows.

At the transmitting operation 604, the base station transmits the access signals over a wireless channel using any one or more of the first set of transmission times and the second set of transmission times.

Figure 7:
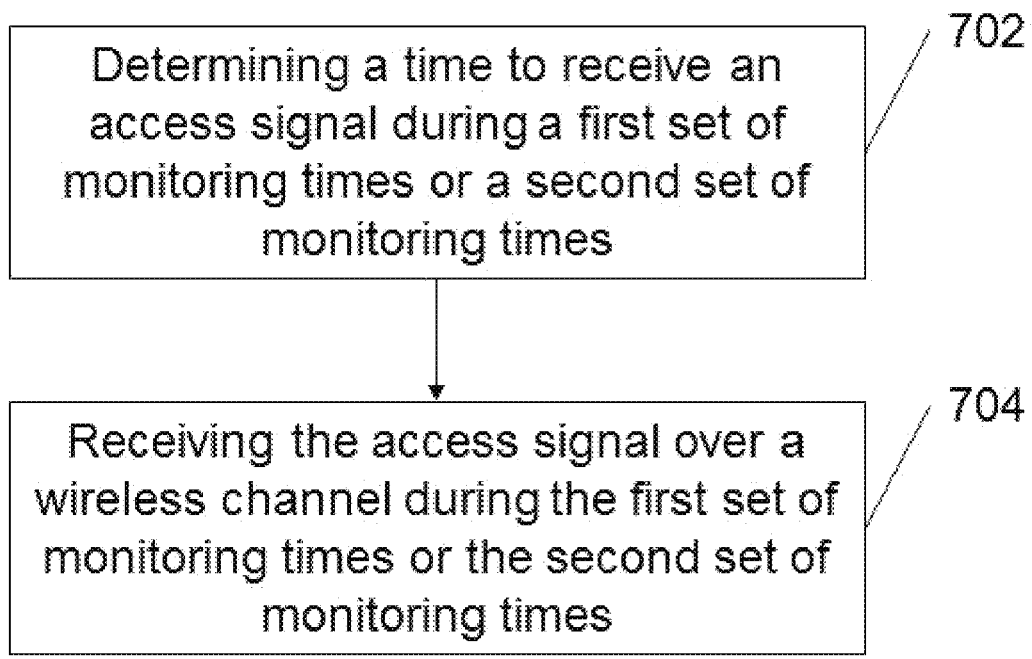
FIG. 7 shows an exemplary flowchart of a wireless communication method to receive access signals.

FIG. 7 shows an exemplary flowchart of a wireless communication method to receive access signals. At the determining operation 702, the user equipment determines a time to receive an access signal during any one or more of a first set of monitoring times and a second set of monitoring times. The access signal includes system information, paging message, or synchronization signal block.

In some embodiments, the time to receive the access signal during the second set of monitoring times is determined based on a relationship between a characteristic of the access signal to be received during the first set of monitoring times and another characteristic of the access signal to be received during the second set of monitoring times. In some other embodiments, the time to receive the access signal during the first set of monitoring times is determined based on based on a relationship between a characteristic of the access signal to be received during the first set of monitoring times and another characteristic of the access signal to be received during the second set of monitoring times.

In some embodiment, the relationship is an offset between a first identifier of the access signal associated with the first set of monitoring times and a second identifier of the access signal associated with the second set of monitoring times. In some other embodiments, the relationship is an offset between a first transmission time of the access signal associated with the first set of monitoring times and a second transmission time of the access signal associated with the second set of monitoring times, and where the first and second transmission times are configured by the base station. In yet some other embodiments, the relationship is an offset between a first monitoring time of the access signal associated with the first set of monitoring times and a second monitoring time of the access signal associated with the second set of monitoring times, and where the first and second monitoring times are determined by the user equipment. In some embodiments, the offset includes a time needed by a base station to transmit all synchronization signal block (SSB) index or all Channel State Information Reference Signal (CSI-RS) resource identifiers.

In some embodiments where the access message includes a paging message, the second set of monitoring times for the paging message are configured to be a next consecutive set of paging times after the first set of monitoring times for the paging message. In some other embodiments where the access message includes a paging message, the second set of monitoring times are configured to receive the paging message at a next paging time after a first set of monitoring times for the paging message, where the next paging time is determined based on an identifier of the user equipment.

At the receiving operation 704, the user equipment receives the access signal over a wireless channel during any one or more of the first set of monitoring times and the second set of monitoring times.

Figure 8:
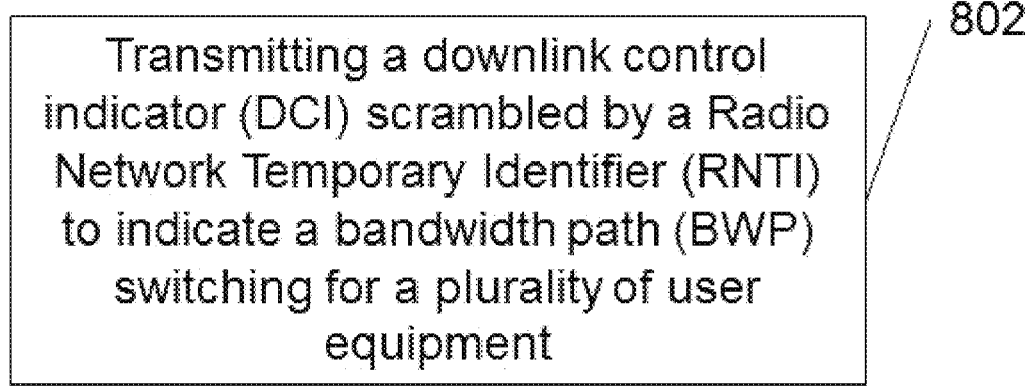
FIG. 8 shows an exemplary flowchart of a wireless communication method to indicate a bandwidth path (BWP) switching for the user equipment.

FIG. 8 shows an exemplary flowchart of a wireless communication method to indicate a bandwidth path (BWP) switching for the user equipment. At the transmitting operation 802, a base station transmits to a plurality of user equipment, a downlink control indicator (DCI) scrambled by a Radio Network Temporary Identifier (RNTI) to indicate a bandwidth path (BWP) switching for the plurality of user equipment. In some embodiments, the RNTI includes a paging RNTI (P-RNTI), a slot format indicator RNTI (SFI-RNTI), or a common RNTI.

Figure 9:
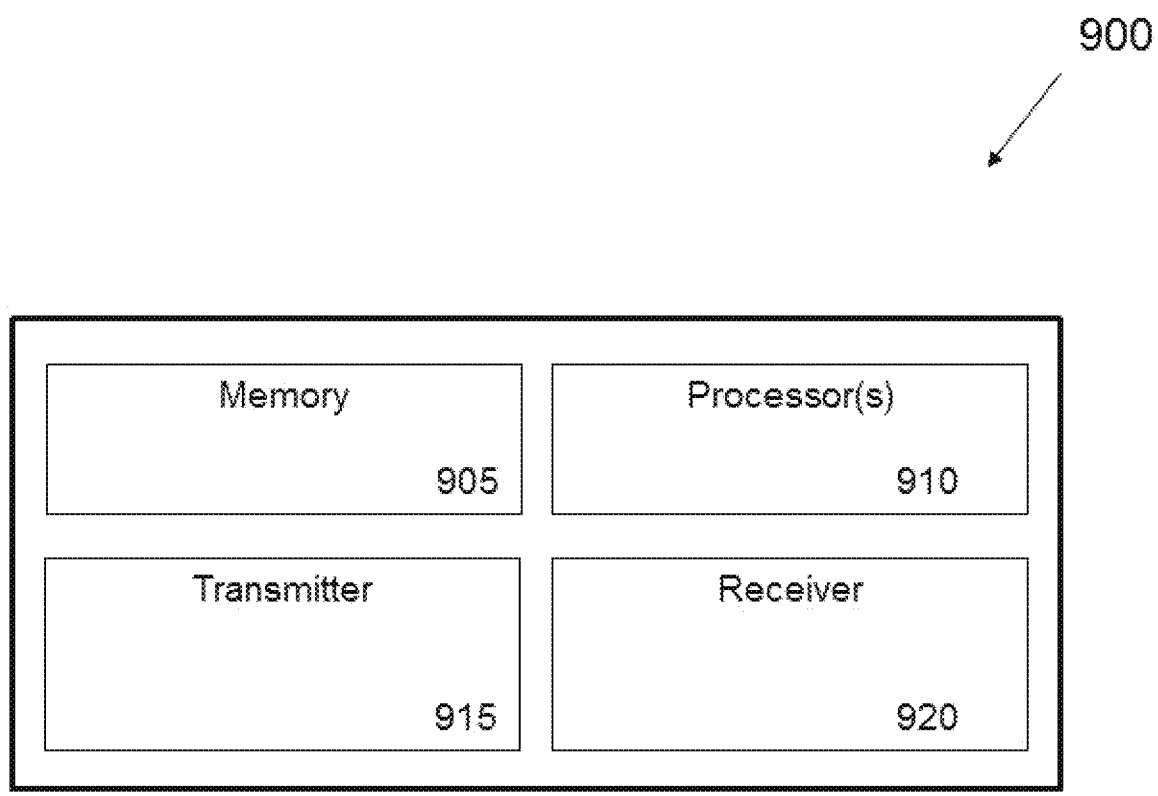
FIG. 9 shows an exemplary block diagram of a base station or a user equipment.

FIG. 9 shows an exemplary block diagram of a hardware platform 900 that may be a part of a base station or a user equipment.

The hardware platform 900 includes at least one processor 910 and a memory 905 having instructions stored thereupon. The instructions upon execution by the processor 910 configure the hardware platform 900 to perform the operations described in FIGS. 6 to 8 and in the various embodiments described in this patent document. The transmitter 915 transmits or sends information or data to another node. For example, a base station transmitter can send access signals to one or more user equipment using the techniques described in this patent document. In another example, the base station can also transmit a DCI scrambled by a RNTI to indicate BWP switching for multiple user equipment. The receiver 920 receives information or data transmitted or sent by another node. For example, a user equipment can receive access signals from a base station using the techniques described in this patent document.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
  determining, by a base station, a first set of transmission times and a second set of transmission times to transmit access signals;
  configuring, by the base station, the second set of transmission times to have an offset relative to the first set of transmission times, with at least one transmission time of the first set of transmission times coinciding with at least one transmission time of the second set of transmission times; and
  transmitting the access signals over a wireless channel using any one or more of the first set of transmission times and the second set of transmission times.

2. The method of claim 1, wherein the access signals include system information, paging message, or synchronization signal block.

3. The method of claim 1, wherein the base station determines to transmit the access signals using the second set of transmission times in response to for the base station determining that the wireless channel was busy at least one transmission time of the first set of transmission times.

4. The method of claim 1, wherein the base station configures a transmission start time for each of the first and second set of transmission times.

5. The method of claim 1, wherein the base station configures the offset or a delay between a first transmission time of the first set of transmission times and a second transmission time from the second set of transmission times.

6. The method of claim 5, wherein the offset includes a time needed by the base station to transmit all synchronization signal block (SSB) index or all Channel State Information Reference Signal (CSI-RS) resource identifiers.

7. The method of claim 1, wherein a first transmission window is associated with the first set of transmission times and a second transmission window is associated with the second set of transmission times, wherein the base station configures a number of access signals to be transmitted within the first and second transmission windows.

8. A computer readable program storage medium having code stored thereon, the code, when executed by a processor, causing the processor to implement a method recited in claim 1.

9. A wireless communication method, comprising:
  determining, by a user equipment, a time to receive an access signal during a first set of monitoring times associated with a first set of transmission times determined by a base station and a second set of monitoring times associated with a second set of transmission times determined by the base station, wherein the second set of transmission times is configured to have an offset relative to the first set of transmission times, with at least one transmission time of the first set of transmission times coinciding with at least one transmission time of the second set of transmission times; and
  receiving the access signal over a wireless channel during any one or more of the first set of monitoring times and the second set of monitoring times.

10. The method of claim 9, wherein the time to receive the access signal during the second set of monitoring times is determined based on a relationship between a characteristic of the access signal to be received during the first set of monitoring times and another characteristic of the access signal to be received during the second set of monitoring times.

11. The method of claim 10, wherein the relationship is the offset between a first identifier of the access signal associated with the first set of monitoring times and a second identifier of the access signal associated with the second set of monitoring times.

12. The method of claim 10,
  wherein the relationship is the offset between the first transmission time of the access signal associated with the first set of monitoring times and the second transmission time of the access signal associated with the second set of monitoring times, and
  wherein the first and second transmission times are configured by the base station.

13. The method of claim 12, wherein the offset includes a time needed by a base station to transmit all synchronization signal block (SSB) index or all Channel State Information Reference Signal (CSI-RS) resource identifiers.

14. The method of claim 10,
  wherein the relationship is the offset between a first monitoring time of the access signal associated with the first set of monitoring times and a second monitoring time of the access signal associated with the second set of monitoring times, and
  wherein the first and second monitoring times are determined by the user equipment.

15. The method of claim 9, wherein the time to receive the access signal during the first set of monitoring times is determined based on a relationship between a characteristic of the access signal to be received during the first set of monitoring times and another characteristic of the access signal to be received during the second set of monitoring times.

16. The method of claim 9,
  wherein the access message includes a paging message, and
  wherein the second set of monitoring times for the paging message are configured to be a next consecutive set of paging times after the first set of monitoring times for the paging message.

17. The method of claim 9,
  wherein the access message includes a paging message, and
  wherein the second set of monitoring times are configured to receive the paging message at a next paging time after a first set of monitoring times for the paging message, wherein the next paging time is determined based on an identifier of the user equipment.

18. The method of claim 9, wherein the access signal includes system information, paging message, or synchronization signal block.

19. An apparatus for wireless communication comprising a processor, configured to:
  determine a first set of transmission times and a second set of transmission times to transmit access signals;
  configure the second set of transmission times to have an offset relative to the first set of transmission times, with at least one transmission time of the first set of transmission times coinciding with at least one transmission time of the second set of transmission times; and transmit, via a transmitter, the access signals over a wireless channel using any one or more of the first set of transmission times and the second set of transmission times.

* * * * *